Sept. 17, 1963  T. O. P. SPEIDEL ET AL  3,104,218
PRESSURE TUBE STRUCTURE
Filed Oct. 1, 1958  2 Sheets-Sheet 2
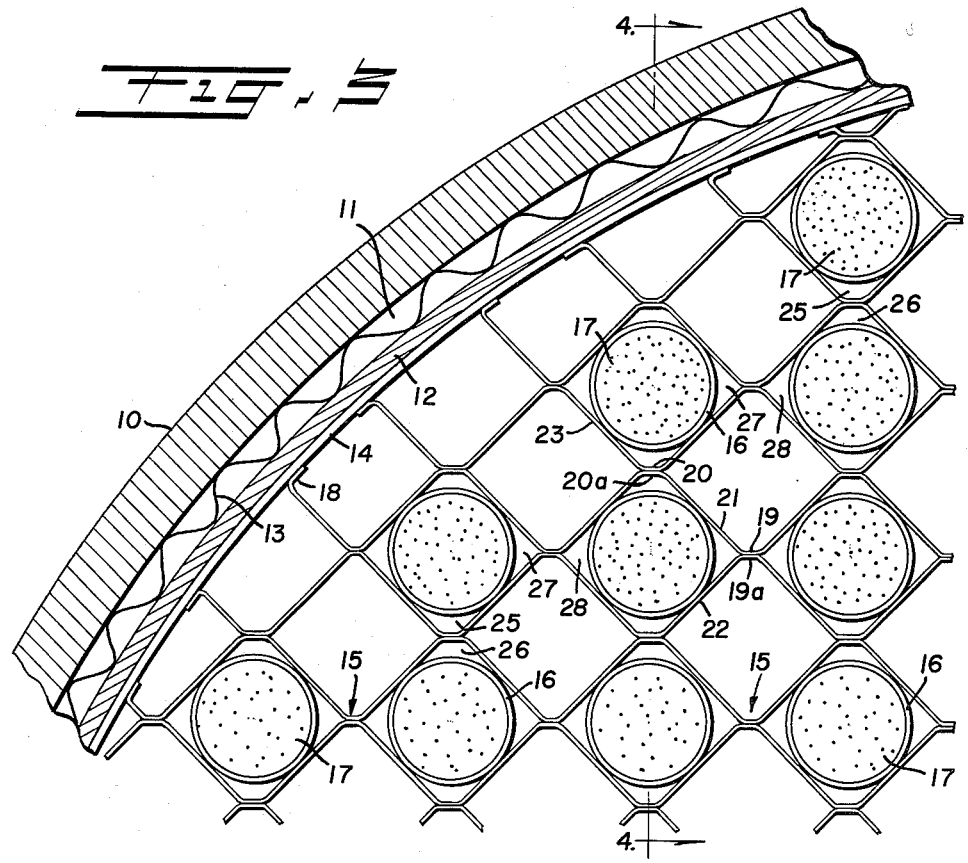
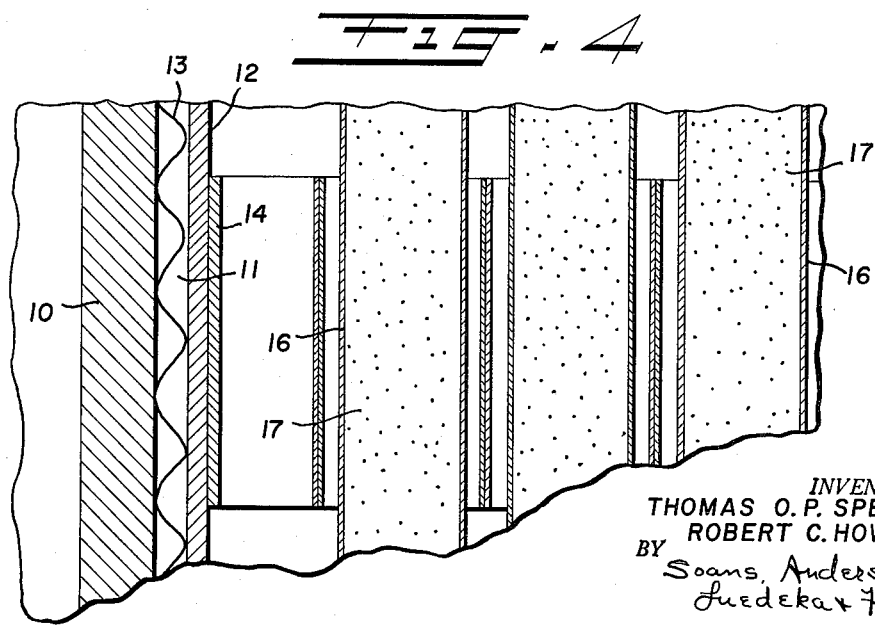
INVENTORS
THOMAS O. P. SPEIDEL
ROBERT C. HOWARD
BY Soans, Anderson,
Luedeka + Fitch
ATTORNEYS

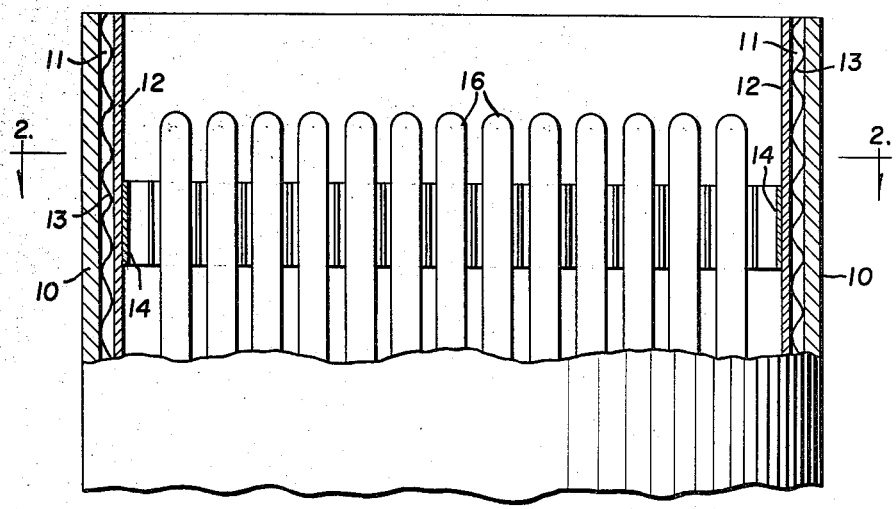
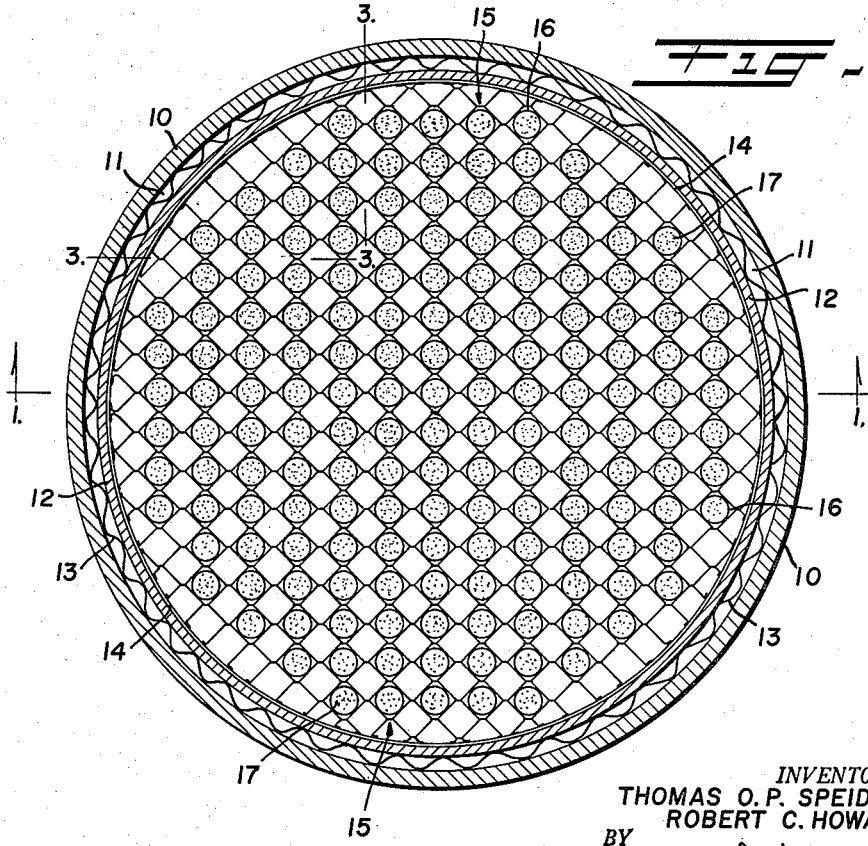

3,104,218
PRESSURE TUBE STRUCTURE

Thomas O. P. Speidel, San Diego, and Robert C. Howard, La Jolla, Calif., assignors to General Dynamics Corporation, New York, N.Y., a corporation of Delaware
Filed Oct. 1, 1958, Ser. No. 764,675
1 Claim. (Cl. 204—193.2)

This invention relates to a pressure tube assembly for use in nuclear power reactors. Although the principles of this invention may well be adapted for use in other applications or systems, the invention as herein described is particularly useful for a pressure tube containing a group of fuel rods of the type in which the solid nuclear fuel is contained in relatively small cladding tubes. Said pressure tube serves as a pipe or duct through which a neutral gas coolant, such as helium or $CO_2$, is forced around the fuel rods or tubes, and which gas, in flowing through the pressure tube, is heated by the fuel rods to a relatively high temperature, say between 1000° to 2000° F., and incidentally, which flow of gas keeps the temperature within the pressure tube down to a safe working level.

The gas coolant after it has been heated in the pressure tubes is conducted to a steam generator or other type of heat extractor. The heat thus taken from the heated gas coolant is then converted into mechanical or electrical energy by means of a steam turbine or other well-known device. After the heated gas has been reduced in temperature by passing through the heat exchanger, it is returned to the reactor and recirculated through the pressure tubes.

In one type or design of nuclear reactor, the fuel rods comprise pellets of solid nuclear fuel clad in a metal container, for example, dense uranium oxide cylindrical pellets contained in metal cladding tubes three or more feet in length, but only about ¼ inch in outside diameter. A pressure tube having an internal diameter of 2 inches or more, and a length of 3 or more feet, serves to enclose a large number of these small fuel rods, as many as 160 or more in certain cases. The cladding metal may be zirconium or stainless steel. In the present instance, stainless steel having a wall .005 inch in thickness may be used. The pressure tube itself, in the case of a tube 6 inches in outside diameter may be made of aluminum with a wall ⅛ inch thick; it being understood that on the inside of the pipe an insulated liner may be employed to prevent the temperature of the wall of the pressure tube from rising to a level which would be unsafe under the pressure to which the pipe might be subjected.

On account of the small diameter of the fuel rods, various problems are encountered in supporting these rods in proper spaced relation within the pressure tube itself. In the present case, suitable supports are provided which are spaced about 8 to 10 inches apart along the length of the fuel rods so that as many as five supports may be needed. Because of the various factors involved in a nuclear reactor of the type herein described, the positioning and spacing devices for the cladding tubes should interfere as little as possible with the free flow of the high temperature gas through the pressure tube from one end to the other. Also, the supports or spacers should not only be relatively short, for example, ⅝ inch in the direction of the pressure tube axis, but should also provide for a relatively unimpeded flow of the gas coolant between the spaced tubes. Also, the metal to metal path between adjacent fuel rods should be as rigid as is possible, consistent with maintenance of proper space between the rods and consistent with proper transfer of heat from the surface of the rods to the flowing gas coolant.

The principal object or purpose of the present invention is to provide an arrangement and construction of the means within the pressure tube for supporting and spacing the fuel rods in such manner that the difficulties and problems heretofore described may be adequately and efficiently overcome or solved, together with attendant advantages and benefits not heretofore obtained in constructions or arrangements of the class described.

In the following specification we shall describe an arrangement in which fuel rods are mechanically supported and stabilized in proper spaced relation, and without significant reduction of efficiency or other advantages by means of a grid of limited thickness (in the direction of the length of the rods), and filling the cross section of the pressure tube. Preferably, such grid may contain a plurality of cells sufficient in number not only to provide a separate cell for each cladding tube which is to be supported therein, but also other cells or openings serving to space or separate the fuel rods, while at the same time providing ducts through which the gas coolant may flow freely through the supporting grid.

One form of such construction which we have successfully used may be termed a modified honeycomb. In such a honeycomb construction, we have found it desirable to modify the shape of the hexagonal cells in the normal honeycomb. Instead of making each of them of truly hexagonal form, each cell which contains a tube has a pair of opposite sides much shorter than the other four sides of the six-sided figure representing the walls of the cell. Such a modified honeycomb arrangement has advantages which will hereafter appear as the specification proceeds, and which, so far as we are advised, have not been obtained or approached by other forms of grids or other structures employed for positioning a group of fuel rods in proper spaced relationship in a pressure tube.

One type of arrangement such as we have described is illustrated in the drawings accompanying this specification, in which:

FIGURE 1 represents an elevation, partly in section, of a portion of a pressure tube assembly made in accordance with the invention;

FIGURE 2 is a sectional plan view taken on the line 2—2 of FIGURE 1;

FIGURE 3 is an enlargement of that portion of FIGURE 2 which is bounded by the lines 3—3—3 of FIGURE 2; and FIGURE 4 is a vertical section taken on the line 4—4 of FIGURE 3.

In these drawings, the numeral 10 represents the outer wall of the pressure pipe or tube, which, in the case of a tube having an outside diameter of 6 inches, would be made of aluminum about ⅛ inch in thickness and designed for a working pressure of up to 600 lbs. per square inch. In a reactor of the type described, and designed to produce 20 megawatts of power, about 20 of these tubes might be enclosed in a tank containing a material which serves as a moderator, for example, heavy water, in accordance with well-known principles employed in the construction and operation of nuclear reactors used for power purposes. The heavy water not only serves as a moderator, but as a means for cooling the outer walls of the pressure tubes to a sufficiently low temperature, for example, 150° F., so that the tensile strength of the aluminum tube is not reduced below that which is reasonably necessary to resist an internal pressure such as 600 lbs. per square inch.

In order to prevent excessive reduction of the temperature of the gas coolant with a resultant loss of efficiency an insulating space 11 is provided between the inside of the wall 10 of the tube and a cylindrical shroud or lining 12. A thin sheet of stainless steel 13, dimpled or corrugated as shown, and filling the annular space between the outer tube 10 and the inner shroud 12, serves to maintain the spacing between the elements 10 and 12, while at the same time, by preventing the heated gas coolant from circulating too freely in said space, it reduces the loss of heat through the outer wall 10 of the tube.

Within the shroud or lining 12 there is supported a series of bands or collars 14 made of stainless steel having a thickness of the order of .005" and adapted to fit within the shroud or lining 12. Said bands or rings 14 are about 8 inches apart and ⅝ inch wide, to the interior of which there are secured, preferably by welding, the ends of the strips of a grid 15, as shown best in FIGURES 2 and 3. The strips of the grid 15 actually support and position the fuel rods which, in the present instance, comprise cladding tubes 16, within which the solid fuel pellets 17 of uranium oxide are contained.

The pattern or mesh of the grid 15 is that of a hexagon or of a modified square. More particularly the mesh is hexagonal in that each opening has six sides, two opposite sides of which are much narrower or shorter than the other four sides of the figure. It resembles a square mesh; however, the two opposite corners of the square are flattened so that those corners of the square become, in fact, additional sides forming, in effect, a six-sided figure.

As shown in the drawings, the fuel rods 16, which in the present instance are about ¼ inch in exterior diameter and are constructed of stainless steel .005 inch in thickness, are of a size to fit snugly within the meshes of the grid. The spacing of said rods is obtained by omitting the fuel tubes in the rows of meshes or cells between the rows of rods.

As shown best in FIGURE 3, the modified honeycomb grid is constructed of a series of corrugated strips or ribbons, in this case of stainless steel ribbon .625 inch in width and having a thickness of approximately .005 inch. These strips extend horizontally across the cross-section of the shroud 12 to which the ends of said strips are united, preferably by welding, as shown for example in FIGURE 3 at 18. In the present instancce, the rods are arranged in spaced parallel rows which extend parallel with the strips, and are so spaced in such rows that they also are arranged in cross rows extending perpendicular to said parallel rows.

Said strips or ribbons are rolled to form V-shaped corrugations in opposite sides of the strips, and extending the full length of the ribbon. The separate cells or meshes of the honeycomb are obtained in the grid shown in FIGURE 3, by reverting alternate strips so as to bring the narrow flat or short side 19 of a strip 21, for example, into contact with the corresponding narrow flat 19a of a strip 22, while at the same time bringing the wider flat 20 of a strip 23 into contact with the wider flat 20a of the strip 21. It is preferable to stabilize the grid by spot-welds at the flats where the crests of the V-shaped corrugations abut or contact each other.

It will be observed that the arrangement described is extremely efficient from the standpoint of the end result, i.e. the support of the fuel rods and the positioning and spacing of the same in the best way to accomplish the desired result, i.e. without significantly impeding the flow of the hot gas through the grid while at the same time preventing direct transfer of heat between the rods by direct metal to metal contact. It will be seen that the rods are spaced so as to provide rows of open cells between the parallel strips, and also rows of open cells between the cross rows of rods. Also, there are provided spaces 25 and 26 adjacent the rods in the same row, and also spaces 27 and 28 between opposed rods in adjacent rows. Furthermore, the construction is exceptionally rigid and efficient from a mechanical standpoint.

It will be observed that the width of the flats or short sides 19 and 19a, as in the case of the flats 20 and 20a, is only a small fraction of the length of the other sides of the cell. The width of the flats 19 and 19a controls the width of the spacing between the cross rows of fuel rods, shown as vertical rows in the drawings. The wider that these flats 19 and 19a are, the greater will be the spacing between these vertical rows of rods. Also, the spacing of the rods in each of these vertical rows is governed by the width of the flats 20 and 20a. However, in such case, the wider that the flats 20 and 20a are, the closer the spacing between adjacent tubes in the rows. It will be understood that these flats 20 and 20a should nevertheless be relatively small so that a substantial space is provided between the said flats and the adjacent surfaces of the adjacent rods in the vertical rows of rods.

It will be understood that if the flats 19 and 19a are made of the same width as the flats 20 and 20a, it is not necessary to reverse alternate strips in order to assemble the strips to form a symmetrical honeycomb design.

Various features of the invention believed to be novel are set forth in the appended claim.

We claim:

A pressure tube structure suitable for use in a gas-cooled nuclear power reactor and comprising (a) an outer pipe adapted to accommodate a stream of coolant gas under pressure and flowing in the direction of the longitudinal axis of the pipe, (b) a group of spaced round rods for containing nuclear fuel and positioned within the outer pipe with their axes parallel with the axis of the outer pipe, and (c) means disposed intermediate the ends of said rods and connected to said pipe for maintaining the spacing of said rods while permitting flow of gas coolant through the pipe comprising a grid made of thin strip metal and which includes a modified honeycomb of parallel rows of six-sided cells, each cell having two opposed sides which are substantially shorter than the other four sides of the cell, and which abut and are united to the shorter sides of adjacent cells so as to prevent contact between the rods and said shorter sides and thereby provide pairs of spaces between rods of adjacent rows on opposite sides of said abutments, for positioning the rods in alternate rows of said cells with said shorter sides interposed between adjacent rods in the rows, said cells being composed of a series of corrugated strips disposed in parallel relationship to each other to form said cells and united to adjacent strips at said points of abutment.

References Cited in the file of this patent

UNITED STATES PATENTS

| | | |
|---|---|---|
| 1,264,758 | Berson | Apr. 30, 1918 |
| 1,591,328 | Lachman | July 6, 1926 |
| 1,703,608 | Bettles | Feb. 26, 1929 |
| 1,946,234 | Price | Feb. 6, 1934 |
| 2,018,085 | Otte | Oct. 22, 1935 |
| 2,056,563 | Budd et al. | Oct. 6, 1936 |
| 2,212,481 | Sendzimir | Aug. 20, 1940 |
| 2,229,344 | Schneider | Jan. 21, 1941 |
| 2,423,896 | Lave | July 15, 1947 |
| 2,806,819 | Christy et al. | Sept. 17, 1957 |